July 9, 1963 C. W. VEKOVIUS ETAL 3,096,889

BILLET GRINDING APPARATUS

Filed June 5, 1959 14 Sheets-Sheet 1

INVENTORS
CHARLES W. VEKOVIUS
WILLIAM M. WOODWARD
BY
Whittemore, Hulbert & Belknap
ATTORNEYS July 9, 1963 C. W. VEKOVIUS ETAL 3,096,889

BILLET GRINDING APPARATUS

Filed June 5, 1959 14 Sheets-Sheet 2

INVENTORS
CHARLES W. VEKOVIUS
WILLIAM M. WOODWARD
BY
Whittemore, Hulbert & Belknap
ATTORNEYS INVENTORS
CHARLES W. VEKOVIUS
WILLIAM M. WOODWARD
BY Whittemore, Hulbert & Belknap
ATTORNEYS July 9, 1963 C. W. VEKOVIUS ETAL 3,096,889
BILLET GRINDING APPARATUS
Filed June 5, 1959 14 Sheets-Sheet 4

INVENTORS
CHARLES W. VEKOVIUS
WILLIAM M. WOODWARD
BY
Whittemore, Hulbert + Belknap
ATTORNEYS INVENTORS
CHARLES W. VEKOVIUS
WILLIAM M. WOODWARD
BY
Whittemore, Hulbert & Belknap
ATTORNEYS INVENTORS
CHARLES W. VEKOVIUS
WILLIAM M. WOODWARD
BY
Whittemore, Hulbert & Belknap
ATTORNEYS INVENTORS
CHARLES W. VEKOVIUS
WILLIAM M. WOODWARD
BY Whittemore, Hulbert & Belknap
ATTORNEYS INVENTORS
CHARLES W. VEKOVIUS
WILLIAM M. WOODWARD
BY
Whittemore, Hulbert & Belknap
ATTORNEYS July 9, 1963 C. W. VEKOVIUS ETAL 3,096,889

BILLET GRINDING APPARATUS

Filed June 5, 1959 14 Sheets-Sheet 9

INVENTORS
CHARLES W. VEKOVIUS
BY WILLIAM M. WOODWARD

Whittemore, Hulbert & Belknap
ATTORNEYS

BILLET GRINDING APPARATUS

Filed June 5, 1959

INVENTORS
CHARLES W. VEKOVIUS
WILLIAM M. WOODWARD
BY Whittemore, Hulbert & Belknap
ATTORNEYS July 9, 1963 C. W. VEKOVIUS ETAL 3,096,889

BILLET GRINDING APPARATUS

Filed June 5, 1959 14 Sheets-Sheet 11

INVENTORS
CHARLES W. VEKOVIUS
BY WILLIAM M. WOODWARD
Whittemore, Hulbert & Belknap
ATTORNEYS

BILLET GRINDING APPARATUS

Filed June 5, 1959

INVENTORS
CHARLES W. VEKOVIUS
WILLIAM M. WOODWARD
BY
Whittemore, Hulbert & Belknap
ATTORNEYS July 9, 1963 C. W. VEKOVIUS ETAL 3,096,889

BILLET GRINDING APPARATUS

Filed June 5, 1959 14 Sheets-Sheet 13

INVENTORS
CHARLES W. VEKOVIUS
WILLIAM M. WOODWARD
BY Whittemore, Hulbert & Belknap
ATTORNEYS INVENTORS
CHARLES W. VEKOVIUS
WILLIAM M. WOODWARD
BY
Whittemore, Hulbert & Belknap
ATTORNEYS 3,096,889

BILLET GRINDING APPARATUS

Charles W. Vekovius, Corunna, and William M. Woodward, Birmingham, Mich., assignors to Mid-West Abrasive Company, Owosso, Mich., a corporation of Delaware Filed June 5, 1959, Ser. No. 818,328
20 Claims. (Cl. 214—1)

This invention relates to grinding apparatus and refers more particularly to apparatus of the type used for grinding metal billets of substantial length.

The invention has for one of its objects to provide grinding apparatus having a billet carriage reciprocable between limits along a predetermined path and an abrasive wheel movable transversely of the path of carriage movement stepwise across the face of the billet during reciprocation of the carriage.

The invention has for another object to provide grinding apparatus as described above in which means are provided for advancing the grinding wheel a small increment at a time across the face of the billet during carriage reciprocation, said means being actuated at each end of the carriage movement, or reversal thereof.

The invention has for a further object to provide a loading and unloading station beyond the limits of carriage reciprocation and having means for speeding up the carriage movement beyond the limits to expedite loading and unloading.

The invention has for a still further object to provide grinding apparatus for automatically grinding the four faces of a billet in succession, having novel turnover mechanism for rotating the billet to present a new face to the grinding wheel.

The invention has for still another object to provide billet turn-over or rotating mechanism which is also operative to eject or discharge the billet from the carriage automatically after all four sides of the billet have been ground.

Other objects and features of the invention will become apparent as the description proceeds, especially when taken in conjunction with the accompanying drawings, illustrating a preferred embodiment of the invention, wherein:

FIG. 18 is a schematic diagram showing the hydraulic system for operating the various parts of the grinding apparatus; and FIGS. 19 and 20 together illustrate a wiring diagram for the apparatus.

Figure 1A:
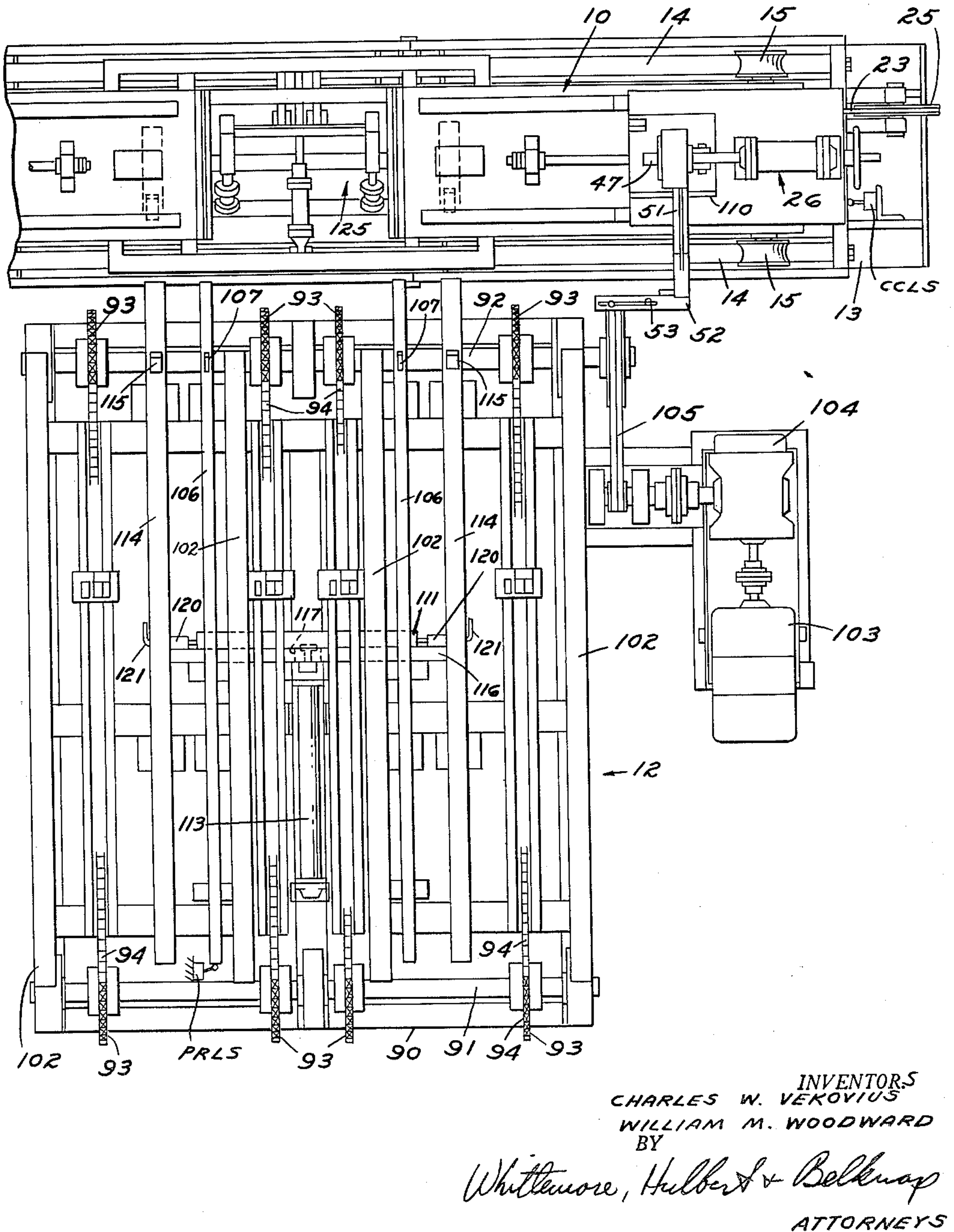
FIGS. 1A and 1B are together a top plan view of grinding apparatus embodying the invention.
Figure 1B:
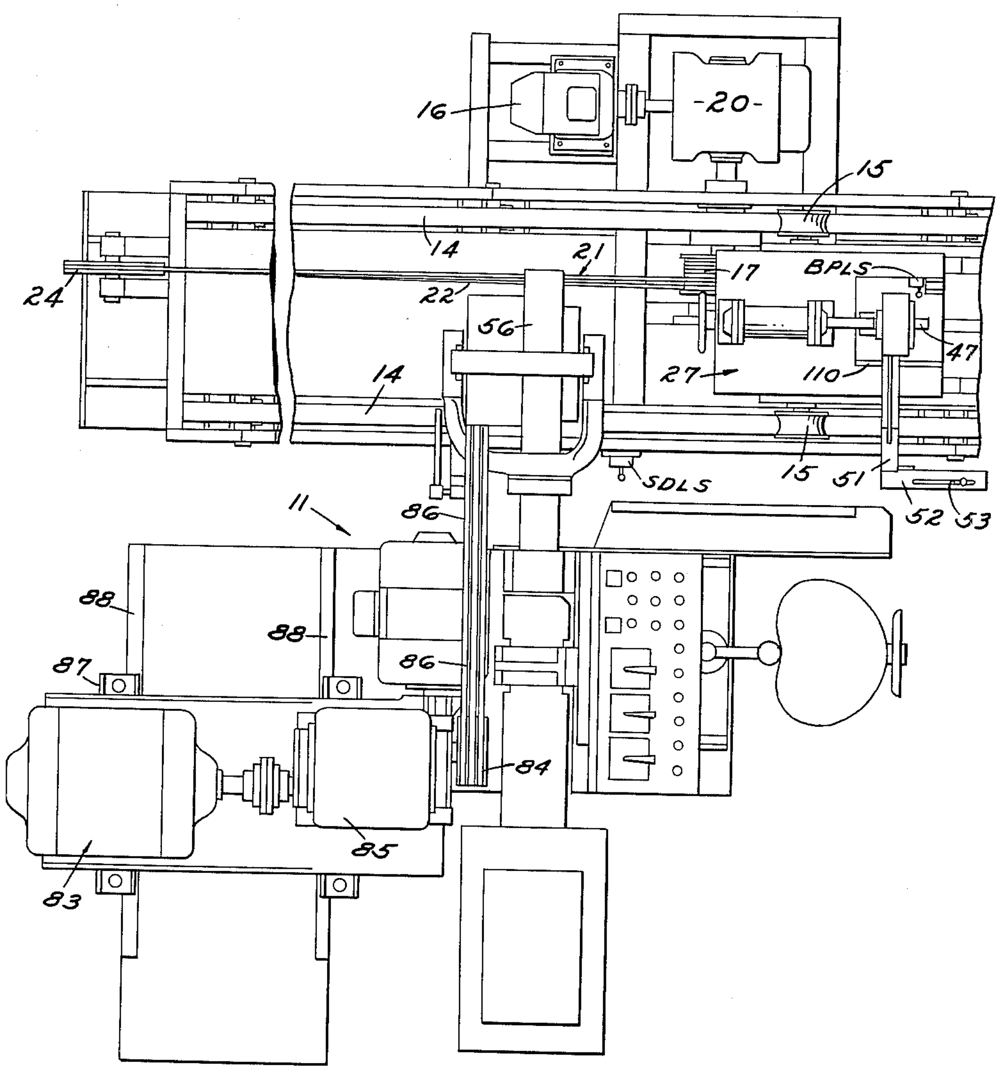

Referring now more particularly to the drawings, and especially FIGS. 1A and 1B thereof, the grinding apparatus comprises a reciprocable carriage 10 adapted to support an elongated metal billet B, a billet grinder 11 for removing metal from the surface of a billet on the carriage, and a loading rack 12 for loading a billet on the carriage prior to each cycle of operation.

The carriage 10 is supported on a frame 13 for reciprocation. In FIG. 1A, the carriage is shown in loading position opposite the loading rack. The elongated frame 13 carries a pair of laterally spaced parallel rails 14 which extend substantially from end to end of the frame. The carriage has a pair of supporting rollers 15 at each end engageable with the rails to support the carriage thereon for reciprocation. The mechanism for reciprocating the carriage includes a hydraulic motor 16 which drives a drum 17 through a gear reducer 20. The drum is supported on the carriage frame beneath the carriage and has a cable 21 thereon the opposite ends 22 and 23 of which are secured to the opposite ends of the carriage. The cable ends 22 and 23 each have an intermediate portion trained over a free pulley 24, 25 respectively rotatably supported on the frame 13 at opposite ends thereof so that rotation of the drum 17 in one direction results in a movement of the carriage to the right and rotation in the opposite direction produces a movement of the carriage to the left.

Figure 2:
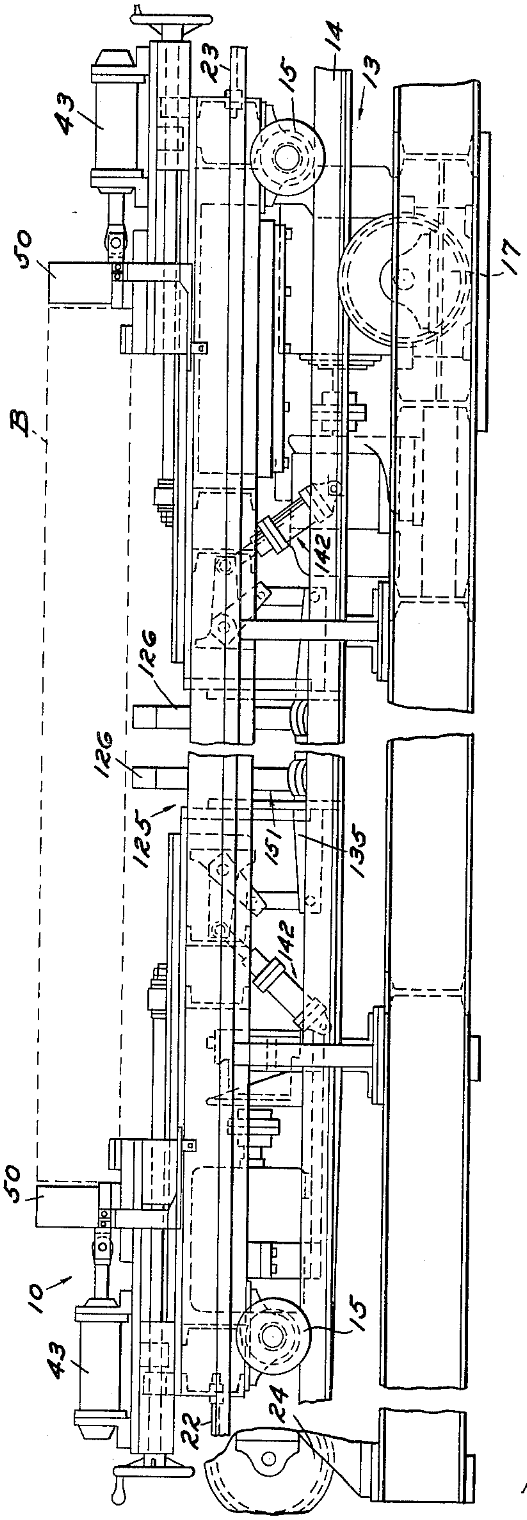
FIG. 2 is a front elevational view of the billet carriage and associated supporting structure.
Figure 3:
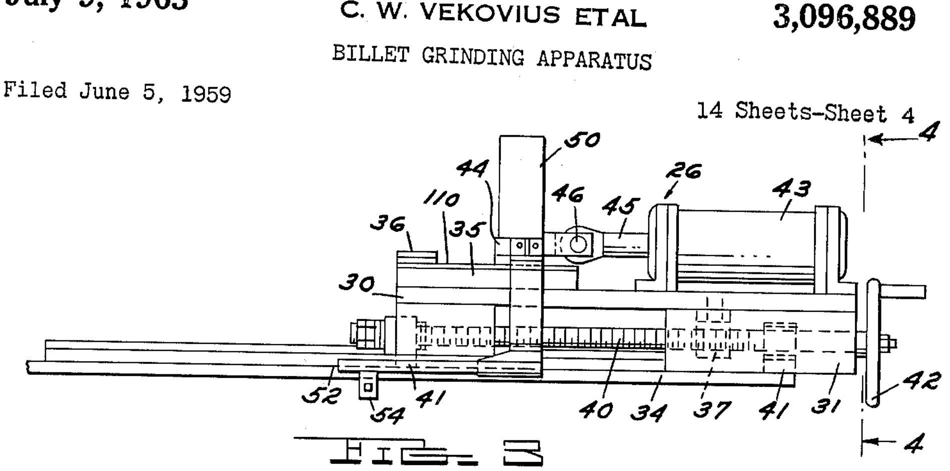
FIG. 3 is an enlarged fragmentary view of one of the billet clamps shown in FIG. 2.

Referring to FIGS. 1A, 1B and 2–5, the carriage is provided with a pair of spaced billet clamps 26 and 27. Since these clamps are identical, only the clamp 26 will be described and corresponding parts of each will be identified by the same numbers. The clamp 26 comprises a generally horizontal mounting plate 30 provided with the depending side bars 31 which are grooved to receive the ribs 32 of guide strips 33 to support the mounting plate for sliding movement in the direction of carriage reciprocation on the base 34 of the carriage. A billet rest pad 35 is supported on the mounting plate 30 of the clamp at the inner end thereof to support a billet B as shown in FIG. 2. Mounted on the rest pad is a back stop 36 for engaging the rear face of the billet to position the same.

The mounting plate 30 is provided with a depending nut 37 which threadedly receives a screw 40 supported on the top of the carriage for rotation by the bearing blocks 41 and provided with a handle 42 at the outer end whereby the screw may be manually rotated to move the clamp mounting plate inwardly and outwardly on the carriage.

The clamp 26 comprises a hydraulic cylinder 43 secured to the mounting plate 30 and having a billet end clamp 44 pivoted at 46 to the rod 45 carried by the piston in cylinder 43. The clamp 44 is guided for reciprocation in a dovetail groove 47 (FIGS. 1A and 1B) in the rest pad 44 which extends in the direction of sliding movement of the mounting plate 30. A block 50 is secured to the clamp 44 and has a height and a width substantially the same as the billet (see FIGS. 2 and 4) and serves to support the grinding wheel, described hereinafter in the event that it overruns the end of the billet during grinding.

Secured to the clamp 44 is a projecting arm 51 which has at its free end a dog support 52 formed with a slot 53 elongated in the direction of carriage movement to support a limit switch trip dog 54 in longitudinally adjusted position thereon. The trip dogs 54 of the two clamps are provided to operate limit switches CFLS and CRLS to control the reciprocation of the carriage during grinding. After the trip dogs have been initially adjusted on the supporting arms, no further adjustment is required in the subsequent operation of the apparatus despite variations in billet length, since the dogs are carried by the clamps which engage the ends of the billet. Each arm 51 has a roller 55 engageable with the clamp mounting plate 30 for support.

The billet grinder 11 is best seen in FIGS. 1B, 6, 7 and 8 and comprises a rotatable grinding wheel 56 formed of a bonded abrasive material and secured to a horizontal shaft 57 which is on the outer end of a boom tube 60 and extends parallel to the direction of carriage movement. The boom tube 60 is supported within an elongated housing 61 by bearings 62 for rotation about the axis of the boom tube and for longitudinal sliding movement. The boom tube is oscillated or rotated about its axis by mechanism indicated generally at 63 which forms no part of the present invention and therefore is not described in detail.

Figure 8:
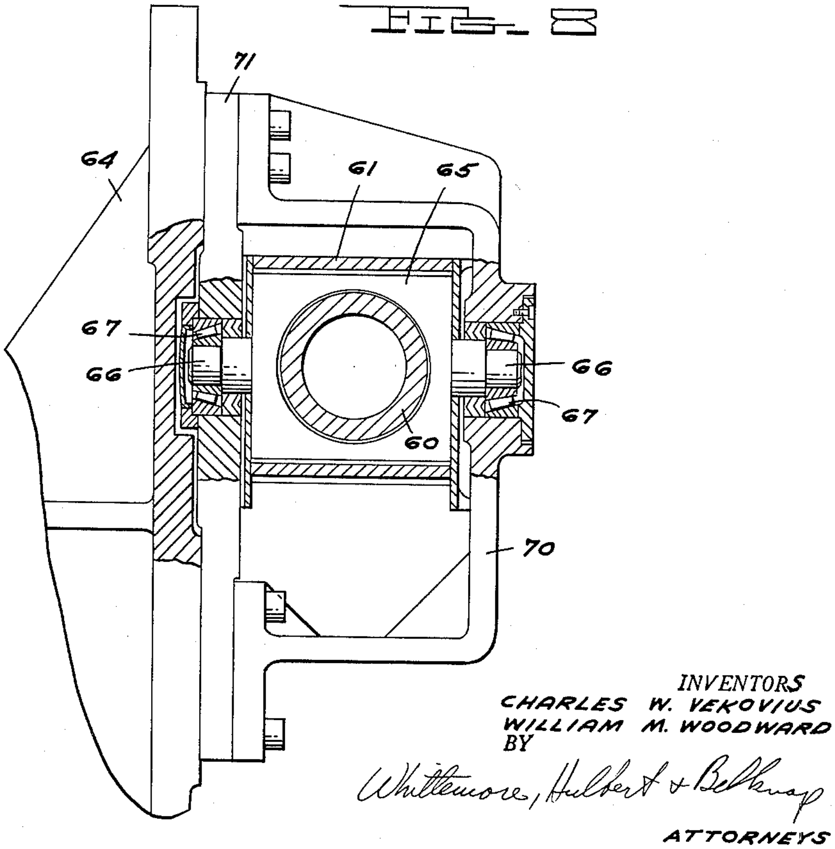
FIG. 8 is a sectional view taken on the line 8—8 of FIG. 6.
Figure 9:
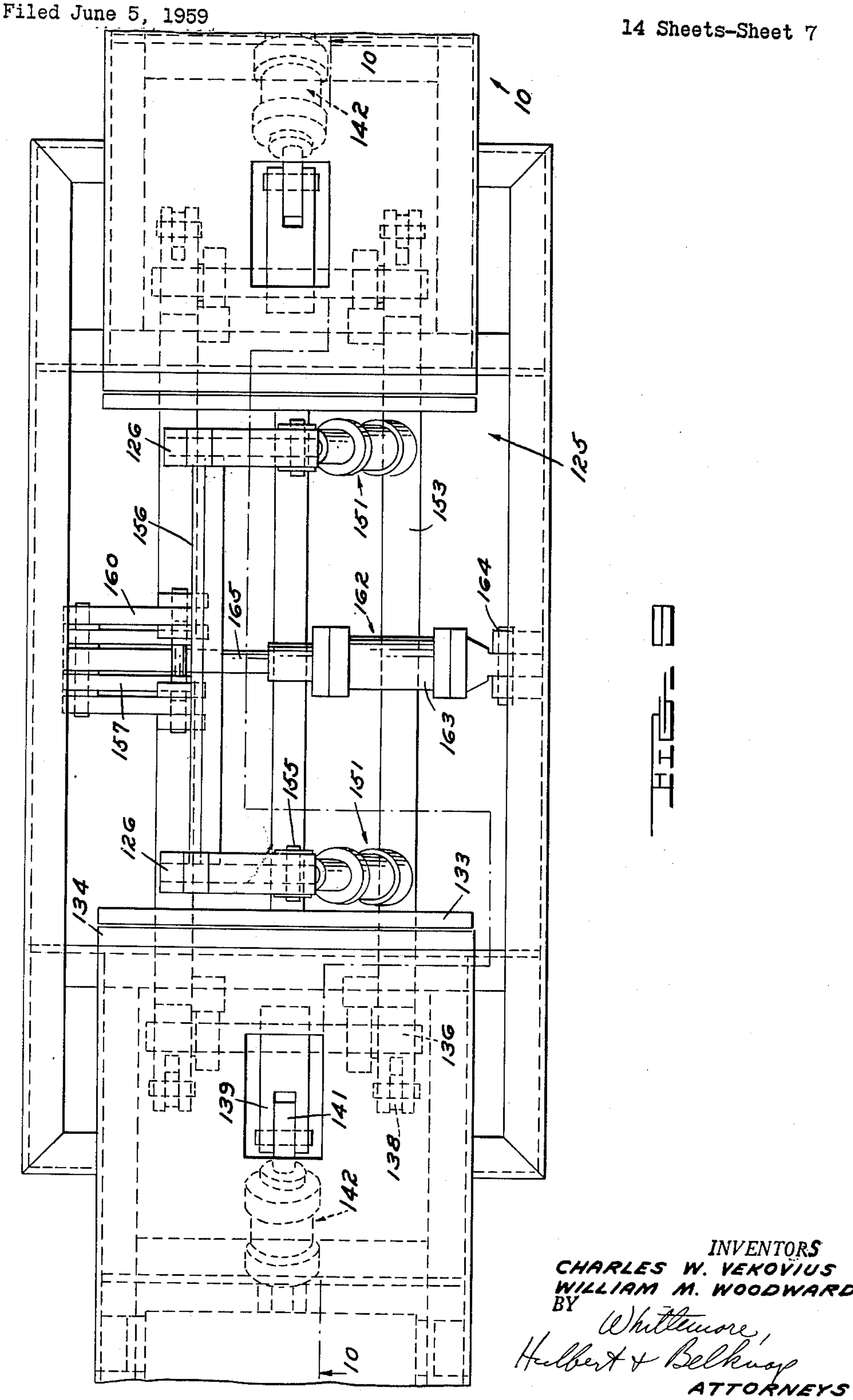
FIG. 9 is an enlarged fragmentary plan view of the carriage illustrating the turn-over mechanism.

Referring to FIG. 8, the housing 61 which supports the boom tube is mounted on fixed frame structure 64 for swinging in a vertical plane to raise and lower the abrasive wheel out of and into engagement with the billet. The housing 61 has secured therein a block 65 which is provided with a central through passage for loosely receiving the boom tube 60. Projecting laterally from opposite sides of the block 65 through openings in the side of the housing are trunnions 66 which are respectively journaled in roller bearings 67 supported respectively by the base of the U-shaped part 70 and the bracket 71 carried by the frame 64. This arrangement permits vertical swinging of the housing 61 and boom tube 60.

Figure 7:
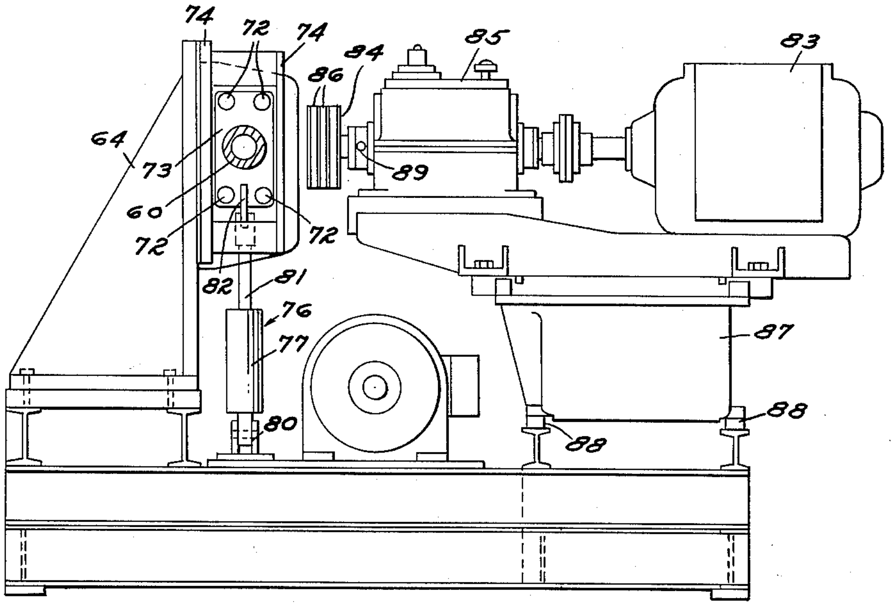
FIG. 7 is a view taken on the line 7—7 of FIG. 6.

Referring to FIG. 7, it will be seen that rollers 72 are journaled on a plate 73 at the four corners thereof in position to engage the laterally spaced vertically extending guide members 74 which are carried by the fixed frame 64. It follows that the boom tube and housing are accurately guided throughout the vertical swinging movement thereof about the pivot axis of trunnions 66.

A fixed counterweight 75 is secured to the housing at the inner end thereof to partially counter-balance the weight of the grinding wheel and associated portions of the boom structure at the outer side of the pivot. The vertical swinging of the boom assembly is accomplished by a double-acting hydraulic piston cylinder assembly 76 which comprises a cylinder 77 pivoted at its lower end to the fixed frame support by a pin 80. The piston within the cylinder has a rod 81 pivotally connected to the guide plate 73 by the member 82. The operation of the piston cylinder assembly 76 to raise and lower the grinding wheel will be described more fully hereinafter.

Hydraulic cylinder 78 is secured to the housing and its piston rod is secured to the end piece 79 on the boom tube to move the boom tube in and out.

The grinding wheel is rotated by an electric motor 83 which drives pulleys 84 through a gear reducer 85. Belts 86 extending over the pulleys 84 are trained over pulleys (not shown) secured to the shaft 57 of the grinding wheel to rotate the latter. The motor 83, pulleys 84 and gear reducer 85 are mounted on a carriage 87 slidable on rails 88 in the direction of boom sliding movement, and a tie rod 89 connects the carriage 87 to the outer end of the boom tube so that the carriage and boom tube may move as a unit toward and away from the billet to be ground.

Figure 16:
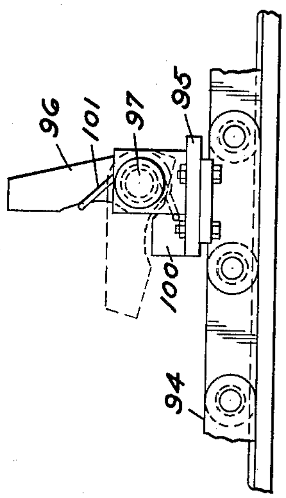
FIG. 16 is an enlarged detail of a portion of the loading apparatus shown in FIG. 15.
Figure 17:
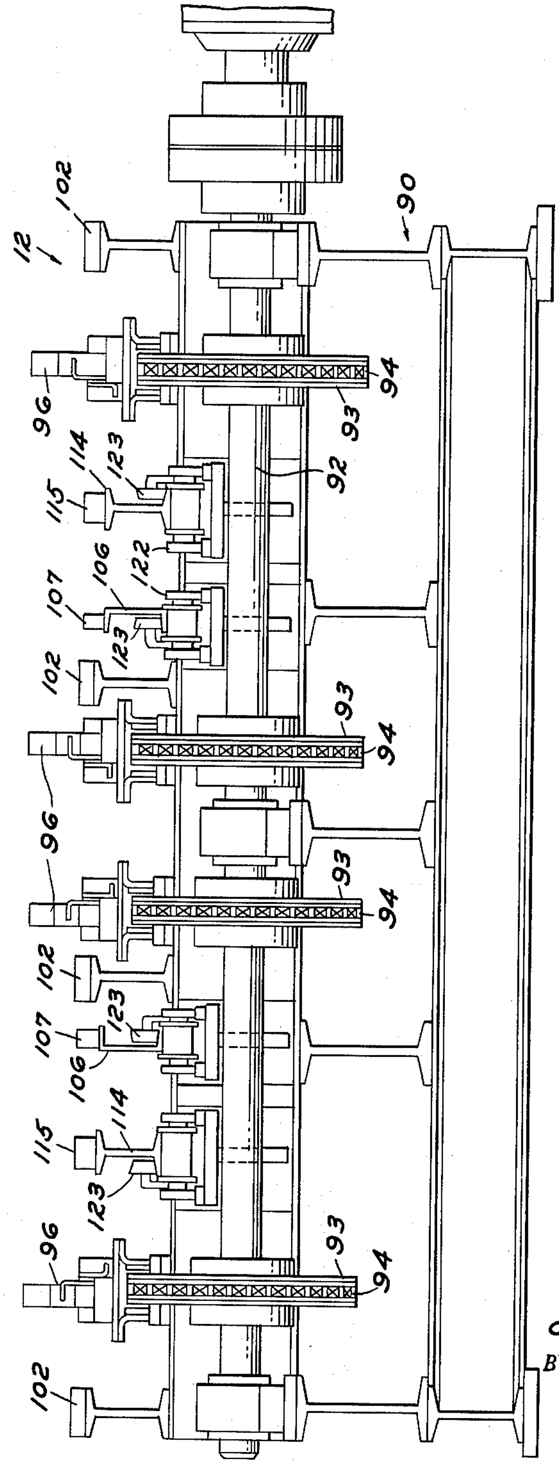
FIG. 17 is an elevational view looking in the direction of the arrow 17 in FIG. 15.
Figure 12:
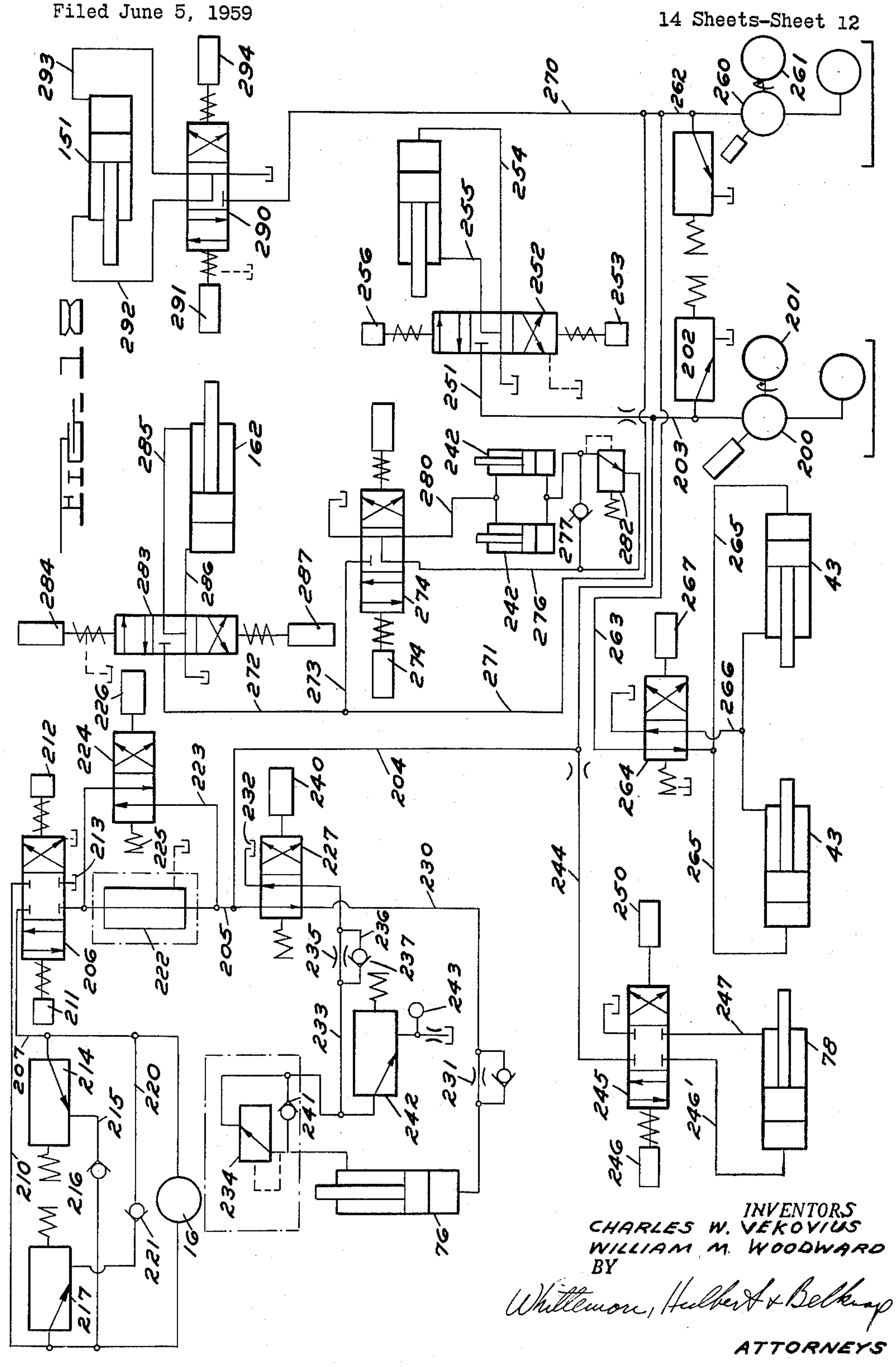
Figure 13:
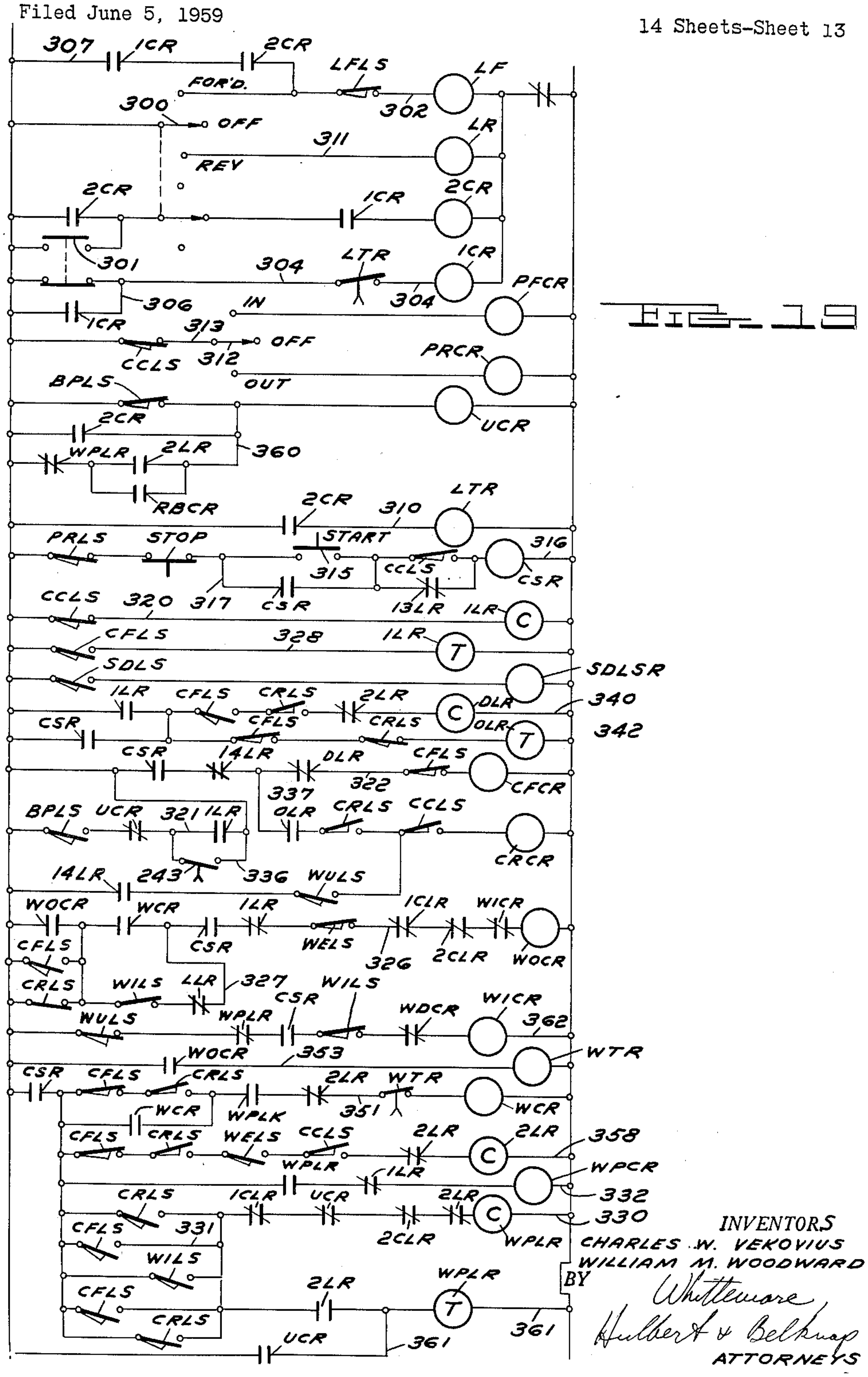

The loading rack indicated generally at 12 comprises a fixed frame 90 and the spaced parallel shafts 91 and 92 supported on the frame for rotation and extending parallel to the path of carriage movement. Each shaft has a plurality of spaced sprockets 93 secured thereto and link chains 94 are trained over and connect the sprockets of one shaft with those of the other. Mounted on chains 94 are the transversely aligned support brackets 95 each having pivoted thereto a normally upright dog 96 pivoted to the bracket for swinging about the horizontal axis of pivot 97. The dogs 96 are held upright against stops 100 by the coil springs 101 but may pivot to the dotted line position of FIG. 16 against the force of the springs.

The rack also includes a plurality of laterally spaced fixed rails 102 which extend normal to the path of carriage movement and the upper horizontal surfaces of which lie in a common plane above the upper runs of the chains. The rails 102 are provided to support a plurality of billets B thereon oriented parallel to the path of carriage movement for eventual transfer to the carriage for grinding. The outer shaft 92 is rotated by an electric motor 103 through a gear reducer 104 and belting 105. Operation of the motor 103 produces an outward movement of the aligned dogs 96, or movement toward the carriage, to advance billets on the fixed rails in that direction. The dogs are enabled to swing to the dotted line position of FIG. 16 to pass under the billets upon reverse movement thereof.

Figure 15:
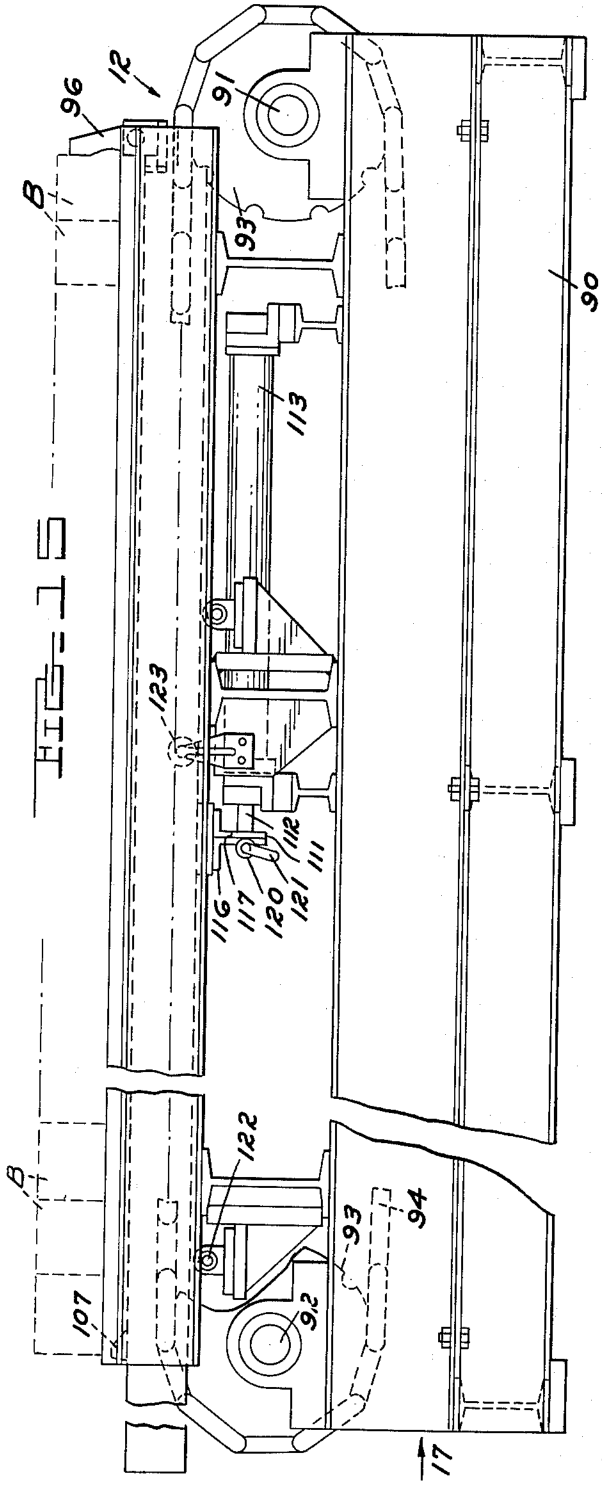
FIG. 15 is a side elevational view of the loading apparatus.

The rack also includes the pair of pusher bars 106 which extend parallel to rails 102 and when retracted terminate at their outer ends beyond the outer ends of the rails as shown in FIGS. 1A and 15. The bars 106 extend horizontally and their top surfaces occupy a plane below the common plane of the rails 102 so that upon outward movement of the dogs 96 carried by the chains, the outermost billet B will be pushed off the rails onto the projecting outer ends of the pusher bars. The pusher bars are shown in retracted position, or at their inner limits, in FIG. 15 and in solid lines in FIG. 1A. The pusher bars 106 have fixed dogs 107 in alignment with each other inwardly of the outer ends of the rails 102 in the retracted position thereof. When the pusher bars are extended to their outer limits, they are effective to transfer a billet supported thereon to the rest pads 35 on the carriage, and the dogs 107 push the billet firmly against the outer stops 36 on the rest pads. The top surfaces of the rest pads lie in a common plane slightly above the pusher bars so that the billet will not be removed from the rest pads by the retraction movement of the bars. The inner edges of the rest pads are beveled as indicated at 110 to facilitate the movement of the billet onto the rest pads.

The pusher bars 106 are connected together by a transverse angle member 111 to which is connected the rod 112 of a piston reciprocable in the cylinder 113. Thus the cylinder 113 is operable to reciprocate the pusher bars between the inner and outer limits.

A second pair of pusher bars 114 are provided laterally outwardly of the bars 106 and likewise are provided with fixed dogs 115 aligned with the dogs 107 of pusher bars 106. The top surfaces of the bars 114 lie in the plane of the top surfaces of pusher bars 106 and are provided to handle longer billets. When handling relatively short billets which do not require the use of pusher bars 114, the latter pusher bars will not be reciprocated with bars 106. However where longer billets are being ground and it is desired to use the more widely spaced pusher bars 114, they are connected to the pusher bars 106 for movement as a unit therewith. The pusher bars 114 are parallel and connected together by an angle member 116 which is at the inner side of the angle member 111 and formed with a central recess 117 for clearing the piston rod 112. At each end of the angle member 116 there is secured a sleeve 120 slidably receiving a pin 121. When the pins are advanced laterally inwardly to overlie the outer sides of the transverse member 111, the pusher bars 114 will be advanced outwardly as a unit with the bars 106, and will likewise be retracted as a unit therewith by reason of the engagement of angle member 111 with member 116. The pusher bars 114 are shown in their extended position in dotted lines on FIG. 1A, which position corresponds to the extended position of pusher bars 106.

The pusher bars are supported for longitudinal sliding movement on the roller assemblies 122 and hold-down rollers 123 are provided for retaining the pusher bars in engagement with the supporting roller assemblies.

Figure 10:
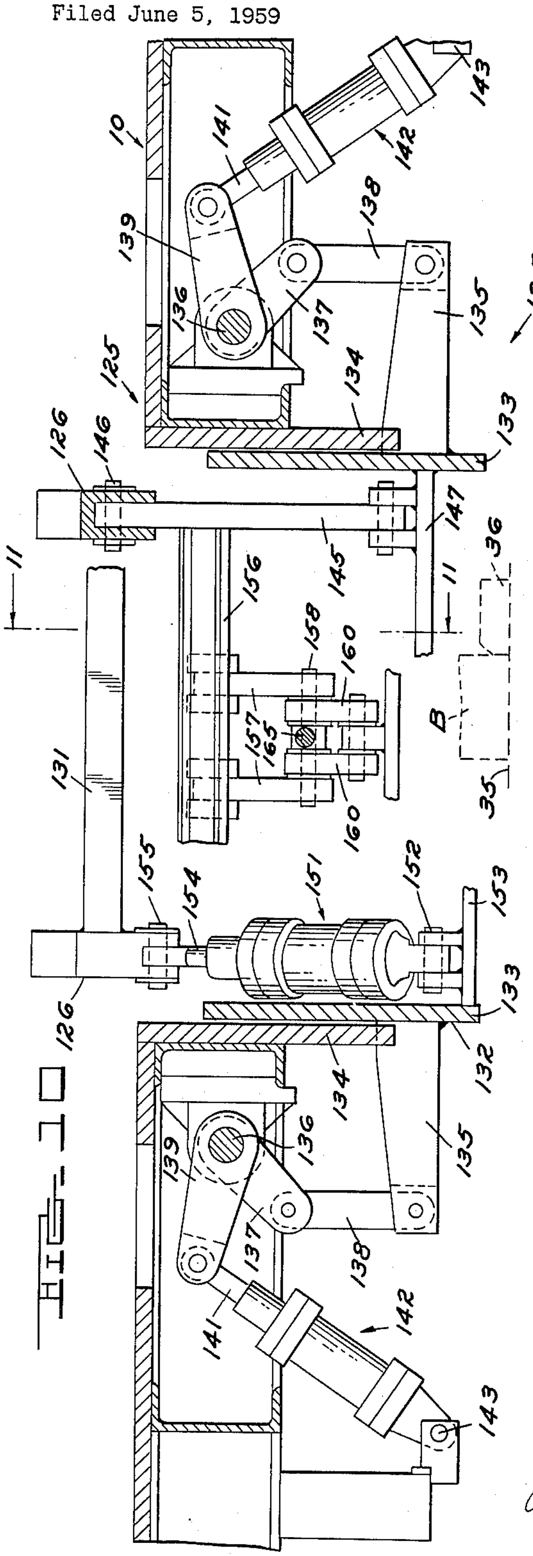
FIG. 10 is a sectional view taken on the line 10—10 of FIG. 9.

The carriage is provided with a centrally located turn-over mechanism 125 shown in FIGS. 9–14. The turn-over mechanism is provided for rotating the square billet B 90° between each grind to present an unground surface to the grinding wheel. The turn-over mechanism comprises a turn-over member in the form of a pair of jaws 126 which are aligned with each other in spaced relation longitudinally of the carriage. The jaws have the coplanar billet supporting surfaces 127 and the coplanar surfaces 130 at right angles thereto, providing a jaw. The jaws 126 are rigidly interconnected by a bar 131 and are supported by a housing 132 supported on the carriage for vertical movement. As seen in FIG. 10, the housing comprises the side plates 133 which are guided for vertical movement between the plates 134 of the carriage, and brackets 135 extend laterally outwardly from and are secured to the housing side plates. Shafts 136 are pivoted to the carriage at each side of the turn-over housing. Secured to each shaft are a pair of arms 137 pivotally connected to the associated housing brackets 135 by links 138. Arms 139 are secured to the respective shafts and pivoted to the rods 141 extending from the pistons of the piston cylinder assemblies 142 which are pivoted to the carriage frame at 143. The cylinder assemblies 142 are double acting and adapted to raise and lower the housing 132 of the turn-over mechanism.

The jaws 126 of the turn-over mechanism are supported on the housing by a parallelogram linkage 144. The linkage 144 comprises the links 145 each of which is pivoted to a jaw 126 at 146 and to a transverse frame member 147 of the housing at 148. The linkage also includes the piston-cylinder assemblies 151, the cylinders of which are pivoted at 152 to the transverse frame member 153 of the housing and the piston rods 154 of which are pivoted to the respective jaws at 155. The pivots 146, 148, 152 and 155 define a parallelogram so that the jaws 126 will remain in the angular position shown in FIG. 11 during in and out movement of the linkage in the retracted position of the assemblies 151. The links 145 are interconnected by a connecting member 156 and pivoted thereto are a pair of links 157. The free ends of the links 157 are carried by a pivot pin 158 to which is pivoted the corresponding ends of links 160. The other ends of the links 160 are connected to a transverse housing frame member 161. A piston-cylinder assembly 162 includes a cylinder 163 pivoted to the housing at 164 and having a piston rod 165 extending from the piston thereof and connected to the pin 158. It will be apparent that in-and-out movement of the parallelogram linkage 144 and hence the jaws 126 is accomplished by the action of the assembly 162.

Figure 11:
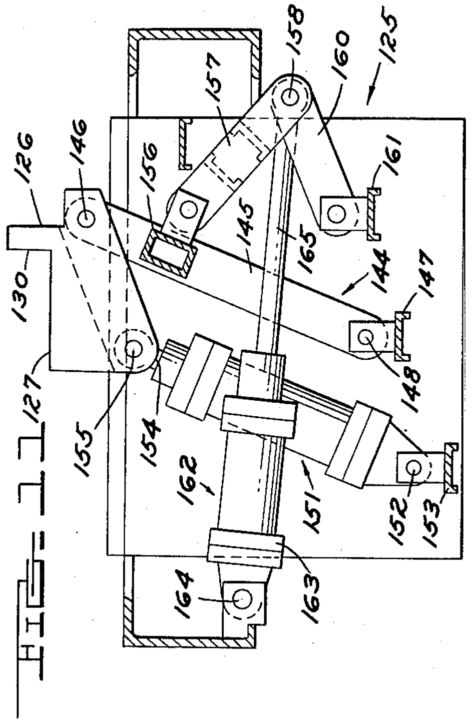
FIG. 11 is a sectional view taken on the line 11—11 of FIG. 10.
Figure 12:
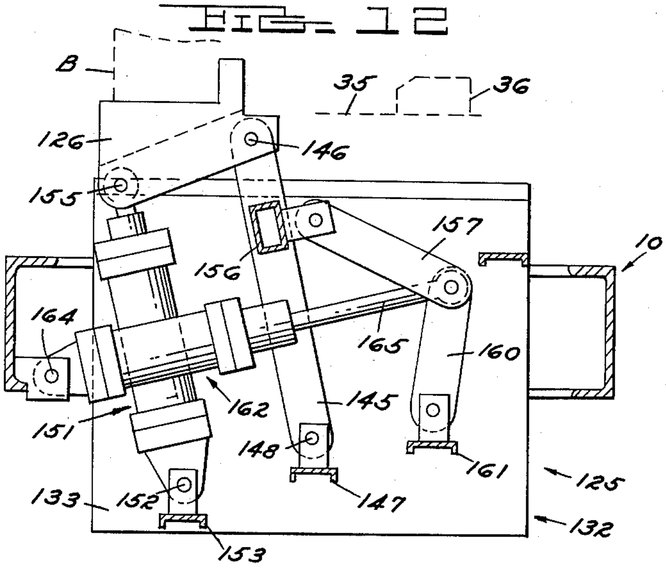
Figure 13:
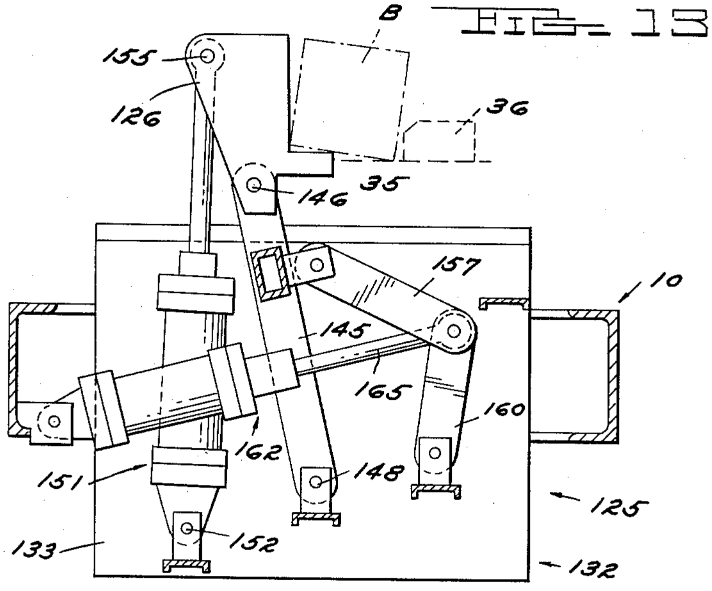

Normally the turn-over mechanism assumes the position shown in FIG. 11 in which it is beneath the billet rest pads and hence clear of the billet. In order to rotate the billet, the housing is elevated to the FIG. 12 position to lift the billet slightly from the rest pads. This is accomplished by the action of cylinder assemblies 142. The parallelogram linkage is then moved inwardly by the assembly 162 as shown in FIG. 12, and thereafter the jaws 126 are rotated to the FIG. 13 position by the operation of cylinder assemblies 151 to rotate the billet. The housing is then lowered to deposit the billet on the rest pads inwardly of the stops. Thereupon the jaws are returned to the angular position of FIG. 11 by the cylinder assemblies 151 and the housing is again elevated. The cylinder assembly 162 is then operated to move the jaws outwardly for engagement of the aligned surfaces 166 thereof with the rotated billet to press it firmly against the outer stops.

FIG. 18 is a schematic diagram showing the hydraulic system for operating the various parts of the grinding apparatus. Hydraulic fluid for operating the carriage and billet grinder is supplied by a pump 200 operated by a motor 201. A pressure relief valve 202 is provided in the output line 203 from the pump which has branches 204 and 205 for operating the carriage drive. The branch 205 leads to a valve 206 from which extend the lines 207 and 210 to opposite sides of the carriage drive motor 16. The valve 206 is controlled by solenoids 211 and 212. When solenoid 211 is energized hydraulic fluid under pressure is delivered to the carriage drive motor 16 through line 207 and is returned to drain 213 through line 210 to move the carriage in one direction. A pressure relief valve 214 is provided in line 207 to by-pass the motor when the pressure exceeds a predetermined maximum through line 215, and a check valve 216 prevents reverse flow. When solenoid 212 is energized the valve is reversed to admit fluid under pressure to the carriage drive motor through line 210 and line 207 returns to drain to move the carriage in the opposite direction. A pressure relief valve 217 is provided in line 210 to by-pass the motor in the event of the operating pressure exceeding a predetermined maximum through by-pass line 220, and check valve 221 prevents reverse flow of fluid. A flow control valve 222 is provided in the branch line 205 to control the speed of the carriage when opposite the grinding wheel in the operative zone for grinding. The control valve is by-passed by a circuit 223 when rapid traverse is desired between the loading position of the carriage shown in FIG. 1A and the operative zone opposite the grinding wheel. A valve 224 in the by-pass circuit 223 is normally positioned as illustrated by a spring 225 to close the by-pass circuit, but may be shifted to a position opening the by-pass circuit for rapid traverse of the carriage by energization of solenoid 226.

The cylinder 76 for controlling the up-and-down movement of the grinding wheel is operated by the valve 227. The valve is spring urged to the illustrated position in which fluid under pressure is delivered to the lower side of the cylinder through line 230 which has a flow restriction 231 therein. Fluid is returned to the drain 232 through line 233 which has in it a counterbalance valve 234 to control the return flow of fluid. The restriction 235 in line 233 is by-passed by the circuit 236 upon return flow of fluid therein across the check valve 237 which prevents flow in the opposite direction. The boom carrying the grinding wheel is lowered by a reversal of the valve 227 which takes place upon energization of solenoid 240. Hydraulic fluid is then delivered to the upper end of cylinder 76 through line 233 and through the by-pass circuit 241. A pressure relief valve 242 is provided in the line 233 which opens when a predetermined pressure is reached to operate the pressure switch 243 as will be more fully described hereinafter.

The fluid line from the pump 200 also has a branch 244 leading to the boom in-out cylinder 78 through the valve 245. When the solenoid 246 is energized, the valve is shifted to direct fluid under pressure to one end of the cylinder through line 246′ and the opposite end of the cylinder is opened to drain through line 247. As a result the boom is moved outwardly or toward the carriage. The valve is reversed by the energization of solenoid 250 to direct the fluid under pressure to the boom cylinder through line 247 and to exhaust the opposite end of the cylinder through line 246′.

The loading cylinder 113 receives fluid under pressure from the pump 200 through branch line 251 and control valve 252. When solenoid 253 is energized, fluid under pressure is delivered to one end of the loading cylinder through line 254 and the opposite end of the cylinder is exhausted through line 255. When the other solenoid 256 is energized, fluid under pressure is delivered to the cylinder through line 255 and line 254 is exhausted. In this way the pusher bars 106 and 114 may be moved inwardly and outwardly.

A second hydraulic pump 260 is provided for the clamp cylinders and turn-over cylinders. The pump is operated by a motor 261 and delivers fluid under pressure through lines 262 and 263 to the control valve 264 for the clamp cylinders 43. Normally the control valve is spring urged to the illustrated position in which it delivers fluid under pressure to the head ends of the clamp cylinders through lines 265 to clamp a billet. The rod ends of the cylinders are opened to exhaust through line 266 and the control valve. When solenoid 267 is energized, the valve is shifted to a position in which fluid under pressure is delivered to the rod ends of the cylinders and the head ends are exhausted to unclamp a billet.

The cylinders of the turn-over mechanism are operated by fluid from the pump 260 through the branch lines 270, 271 and 272. Branch line 271 leads through line 273 to the control valve 274 for the housing lift cylinders 142. When the solenoid 274 is energized the valve is shifted to a position admitting fluid to the head ends of the cylinders through line 276 and across check valve 277 to lift the turn-over housing. Exhaust fluid from the rod ends of the cylinders returns to drain through the valve by way of line 280. When the valve is reversed upon energization of solenoid 281, hydraulic fluid under pressure goes to the rod ends of the cylinder and head ends are exhausted through the counterbalance valve 282 in line 276. The cylinder 162 for moving the turn-over jaws in and out receives hydraulic fluid from line 272 through valve 283 which, when solenoid 284 is energized, admits fluid under pressure to the rod end of the cylinder through line 285 and exhausts the head end through line 286. The valve is reversed by energization of the solenoid 287. The jaw rotate cylinder 151 receives hydraulic fluid from line 270 through control valve 290 which, when solenoid 291 is energized, delivers fluid under pressure to the rod end of the cylinder through line 292 during which time the head end of the cylinder is exhausted through line 293. The valve is reversed upon energization of solenoid 294.

Figures 4, 5:
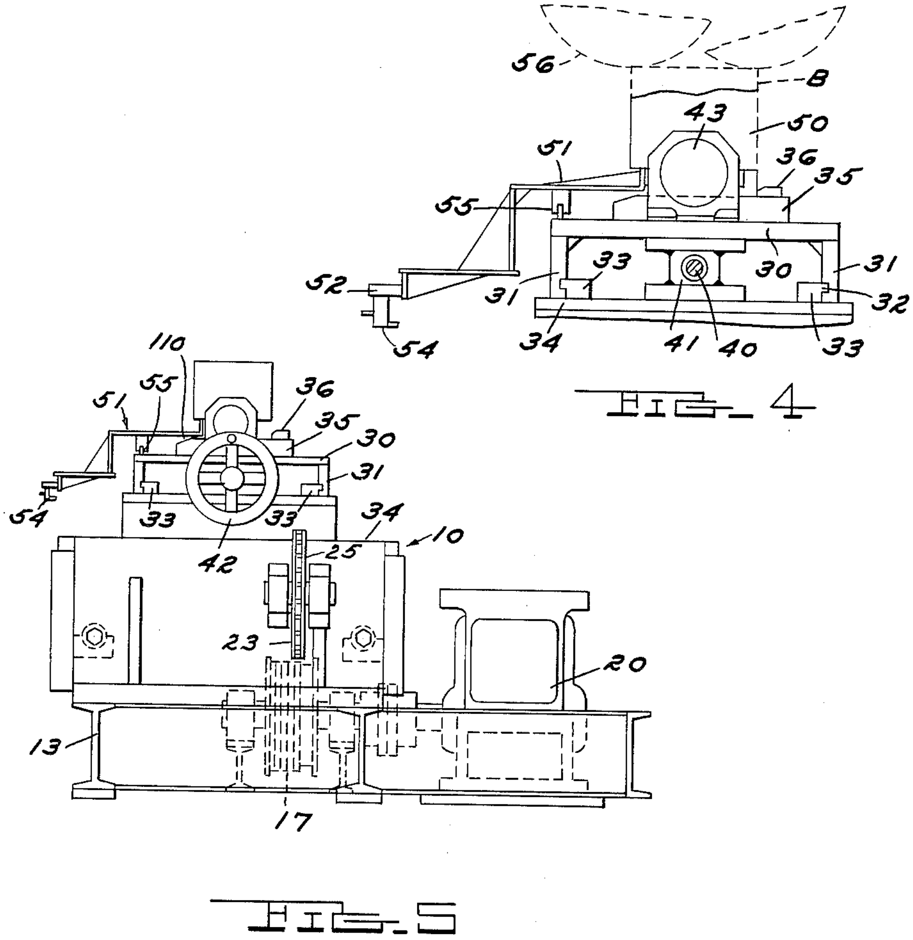
FIG. 4 is a sectional view taken on the line 4—4 of FIG. 3.
FIG. 5 is an end view of the carriage and supporting structure.
Figure 6:
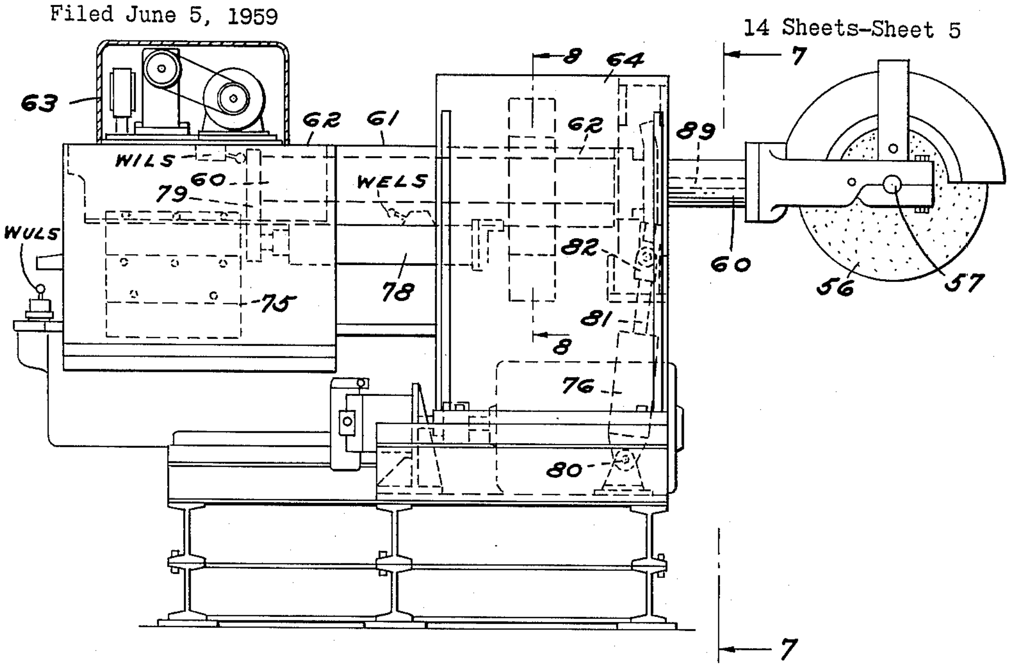
FIG. 6 is a side elevational view of the grinding wheel and supporting structure.

Briefly the operation is as follows: Initially the carriage 10 is in the loading position opposite the loading rack 12 as illustrated in FIG. 1A. The motor 103 of the loading rack is operated to advance the dogs 96 far enough to push a billet from rails 102 onto the outer extensions of the pusher bars 106 and 114. The pusher bars 106 are then advanced in an outward direction to transfer the billet to the rest pads 35 of the carriage billet clamps against the back stops 36. Pusher bars 114 may operate with bars 106 if desired, as described above, when longer billets are handled. The billet is automatically clamped and the pusher bars are retracted. Thereafter the automatic cycling button 315 is pushed to initiate the automatic operation of the machine. The carriage moves from loading position to the left until the dog 54 carried by the righthand carriage clamp operates the forward limit switch CFLS stopping the carriage with the righthand end of the billet directly under the grinding wheel. The carriage moves in rapid traverse from loading position until its dog 54 of the lefthand billet clamp operates limit switch SDLS to slow the carriage for grinding. The grinding wheel is then automatically advanced and lowered for engagement with the inner edge of the billet, that is the edge nearest the support for the grinding wheel boom. When the grinding wheel is engaged with the billet under a predetermined pressure sufficient for grinding, the carriage begins its reciprocation by movement to the right until the lefthand end of the billet is under the grinding wheel. The operating or grinding zone then in which the carriage reciprocates during grinding is determined by the length of the billet and extends from one end thereof to the other. The movement of the carriage to the right stops and is reversed when the dog 54 of the lefthand billet clamp engages the rearward limit switch CRLS. The carriage continues to reciprocate between the limits determined by switches CFLS and CRLS at a relatively slow speed. At each end of the carriage travel or reversal thereof, the grinding wheel is indexed outwardly a small increment so that on each pass of the billet with respect to the grinding wheel an unground surface is engaged by the wheel. This continues until the grinding wheel reaches the outer edge of the billet as shown in FIG. 4, and when the grinding wheel is indexed to this position at either end of the carriage stroke, the carriage is then permitted one more pass beneath the grinding wheel to its other limit and stops at said other limit. Thereupon the grinding wheel is raised and retracted to its initial inward limit, the billet is unclamped, and the turnover mechanism rotates the billet 90° to present the second side of the billet for grinding. With the billet properly rotated and positioned on the carriage rest pads against back stops 36, it is again automatically clamped and the grinding wheel advanced outwardly and lowered to engagement with the inner edge of the billet and the cycle of reciprocation repeated on the second side.

All four sides of the billet are ground in this manner, being rotated 90° between each cycle of reciprocation. After the fourth side of the billet has been ground, the carriage moves to the loading position opposite the loading rack and the turnover mechanism is then automatically operated to eject the ground billet from the carriage. The automatic cycle is now complete and in order to grind a second billet it is necessary to load the carriage in the manner previously described and then initiate the automatic cycle by operation of the start button 315.

Movement of the carriage to loading position is rapid after the lefthand dog 54 again operates limit switch SDLS.

Figure 20:
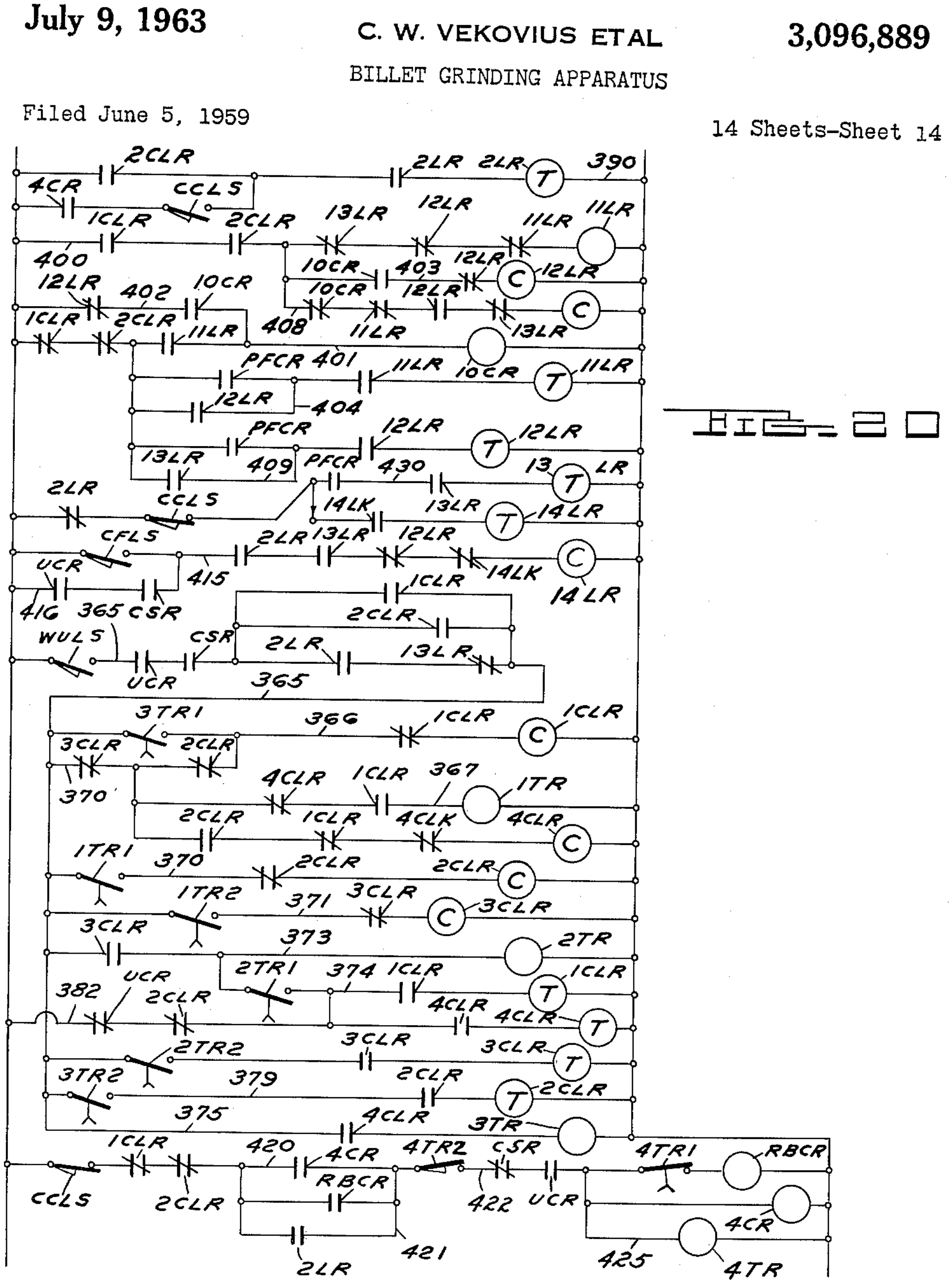

The operation of the grinding apparatus will be described together with a description of the wiring diagram shown in FIGS. 19 and 20. Throughout this diagram, there are shown latching relays the close coils of which are designated C and the trip coils T. When the closed coil is energized it remains latched and energized until the trip coil T of the relay is operated. Prior to the start of a cycle, the carriage will assume a loading position opposite the loading rack, as illustrated in FIG. 1A. The loading rack is operated either by switch 300 or by the inch button 301. When the switch 300 is operated to close the circuit 302, the motor starter relay LF is energized to operate motor 103 of the rack to advance the dogs 96 and push the row of billets outwardly until the outwardmost billet drops onto the outer extensions of the pusher bars. This is under the control of the operator through the manual switch 300. Alternatively, the pusher dogs 96 may be moved outwardly to drop a billet on the pusher bars by the inch button 301 which is manually operated. When the inch button 301 is operated to close circuit 303, relay 2CR is energized through the closed contact 1CR. This contact is closed due to the energization of relay 1CR in circuit 304 which is normally energized through the contact 305 of the inch button. The contact 1CR in circuit 306 seals in the relay 1CR. Energization of relay 2CR closes the circuit 307 by closing its contact 2CR therein, contact 1CR being closed due to the energization of relay 1CR. The loading timer relay LTR in circuit 310 is energized by the closing of contact 2CR, and when this relay times out the timer contact LTR in circuit 304 de-energizes relay 1CR to open its contact in circuit 307 and thereby de-energize the motor starter relay LF to terminate the outward movement of the dogs 96. The inch button will normally be employed to drop a billet onto the pusher bars, and the timer relay LTR is set to permit an advance of the dogs 96 a distance approximating the width of a billet.

The pusher dogs may be moved inwardly by the manual switch 300 when moved to close circuit 311 to the motor starter relay LR which operates the motor 103 in the reverse direction.

The pusher bars 106 are operated by the manual switch 312 in circuit 313. The operation of the pusher bars can take place only in the unloading position of the carriage in which position the carriage closes the normally open limit switch CCLS in circuit 313. When the switch 312 is moved upwardly, control relay PFCR is energized which is effective to energize solenoid 256 of the control valve 252 to move the pusher bars outwardly or toward the carriage by the loading cylinder 113. Movement of the switch 312 in the opposite direction to energize relay PRCR energizes solenoid 253 of the control valve to retract the pusher bars inwardly.

The pusher bars, upon outward or loading movement thereof, load a billet onto the rest pads of the carriage in position against the outer stops, in which position the billet opens the normally closed limit switch BPLS to de-energize the clamp relay UCR thereby de-energizing solenoid 267 of the control valve 264 to clamp the billet by means of the clamp cylinders 43.

The automatic cycle is then commenced by momentarily closing the cycle starter button 315 in circuit 316 to energize cycle start relay CSR and the circuit to this relay is sealed in by the contact CSR in circuit 317. The cycle start relay cannot be energized until the pusher bars are fully retracted to their inner limit to close the pusher return limit switch PRLS in circuit 316. The carriage must also be in the loading position to close limit switch CCLS in circuit 316.

With the carriage in loading position, it closes the normally open contact CCLS in circuit 320 energizing the close coil of latching relay 1LR which remains energized until its trip coil in circuit 328 is energized. Energization of this relay closes its contact 1LR in circuit 321 to energize the carriage forward control relay CFCR in circuit 322. The contact CSR in circuit 322 is closed upon the energization of its relay. Also the limit switch BPLS closed by the billet has a contact in the circuit 363 to complete the circuit to relay CFCR. The relay CFLR energizes solenoid 211 of control valve 206 to operate the carriage drive motor in a direction to move the carriage forwardly or to the left in FIGS. 1A and 1B. When the carriage reaches its forward limit in which the right end of the billet is approximately under the grinding wheel, the carriage forward limit switch contact CFLS in circuit 322 is opened by dog 54 on the right-hand clamp to de-energize the carriage forward control relay CFCR to stop motor 16. The carriage forward limit switch CFLS has a number of contacts in the various circuits throughout the diagram and these contacts are shown in the position they assume when the carriage is in the loading position. The limit switch CFLS is operated once when the carriage reaches and slightly passes its forward limit and again when the carriage later reverses. Hence the contact CFLS in circuit 322 is opened when the carriage hits its forward limit and is again closed upon later reversal of the carriage. The carriage rearward limit switch CRLS has a number of contacts throughout the circuits of the diagram and operates in a like manner. Throughout the diagrams, switches CFLS and CRLS are shown in the loading position of the carriage. These limit switches are not shown other than in the wiring diagram, but are located beneath grinding wheel 56 in FIG. 1B. The carriage moves from loading position in rapid traverse until just before it reaches the grinding zone, that is the zone where the billet is under the grinding wheel, and when it reaches this point dog 54 of the lefthand clamp operates the slow-down limit switch SDLS to energize relay SDLSR. This relay operates solenoid 226 to close the rapid traverse by-pass circuit 223 and require the operating fluid for motor 16 to pass through restriction 222 to slow down the carriage movement. The carriage thus moves slowly throughout the grinding reciprocation to follow.

With the carriage now at its forward limit, limit switch CFLS in circuit 325 is closed to energize the wheel out control relay WOCR in circuit 326 through the wheel in limit switch WILS and the normally closed contact 2LR in circuit 327. The trip coil of latching relay 1LR in circuit 328 is operated at the forward limit of the carriage to de-energize the close coil of the relay 1LR in circuit 328 which results from closing of CLSS in circuit 328 at the forward limit, and as a result the normally closed contact 1LR in circuit 326 closes to complete the circuit to the wheel out control relay WOCR. This relay then energizes the solenoid 246 of control valve 245 to move the boom and grinding wheel out to an initial or starting position determined by the opening of the wheel in limit switch WILS.

Also energized at the forward limit of the carriage is the wheel pressure latching relay WPLR in circuit 330, the circuit being closed by the contact CFLS in circuit 331. Energization of this relay closes its contact in the circuit 332 to energize the wheel pressure control relay WPCR which energizes the pull down cylinder 76 to lower the grinding wheel toward the work. The grinding wheel engages the billet at the inner edge thereof shown in FIG. 4 at the left valve 242 opens to operate the pressure switch the relief valve 242 opens to operate the pressure switch 243 in circuit 336 to close the circuit to the carriage reverse control relay CRCR in circuit 337. Contact OLR in this circuit is closed because the close coil of its latching relay in circuit 340 is energized because both contacts CFLS and CRLS in the circuit are closed at the forward limit of the carriage. Likewise the contacts CRLS and CCLS in circuit 337 are closed at the forward limit. Energization of the relay CRCR reverses the carriage movement by energizing solenoid 212 to shift the valve 206 in a direction reversing the carriage drive motor. The carriage continues in a reverse direction until the limit switch CRLS is opened by the dog 54 carried by the lefthand billet clamp, which occurs substantially when the lefthand end of the billet is under the grinding wheel. At the rearward limit of the carriage, the contacts CFLS and CRLS in circuit 342 are closed to energize the trip coil of the OLR relay de-energizing the same and opening its contact OLR in circuit 337 and closing its contact in circuit 322 to the carriage forward control relay CFCR. At the rear limit of the carriage, the contact CFLS in this latter circuit is closed to reverse the carriage for movement in a forward direction. The carriage continues to reciprocate, reversing itself at each end of travel.

At each limit of carriage travel, one or the other of limit switch contacts CFLS and CRLS in circuits 325 and 350 close to energize the wheel out control relay WOCR through the contact WCR in the circuit 326. This contact is closed by the energization of wheel control relay WCR in circuit 351 which circuit is closed when the carriage is between its limits during which time the contacts CFLS and CRLS are closed which circuit is then sealed in. Energization of the wheel out control relay operates to energize solenoid 250 of the control valve 245 to move the grinding wheel outwardly across the billet a predetermined increment determined by the setting of the wheel index timer WTR in circuit 353. This timer WTR is operated by energization of relay WOCR at either end of the carriage travel by the closing of its contact in circuit 353 to the timer. When this timer times out, its contact in circuit 351 opens to de-energize the wheel control relay WCR opening the circuit 326 to the wheel out control relay. The timer WTR may be selected to provide a predetermined increment of outward movement of the grinding wheel at each end of the carriage travel. Hence the grinding wheel traverses an unground portion of the billet face upon each stroke of the carriage.

When the grinding wheel reaches its outer limit of travel, shown in the right position of FIG. 4, limit switch WELS in circuit 358 closes, and contacts CFLS and CRLS in this circuit close when the carriage is next between its limits to energize the close coil of latching relay 2LR. WELS has a second contact in circuit 326 which now opens so that no further outward indexing of the grinding wheel can take place. Energization of relay 2LR closes contact 2LR in the circuit 360 to the clamp relay UCR.

However for the moment contact WPLR of the wheel pressure relay is open so that the clamp relay is not yet energized. When the carriage reaches its opposite limit, either forward or rearward, the limit switch CFLS or CRLS closes to energize the trip coil of the wheel pressure latching relay WPLR in circuit 361 to unlatch and de-energize the relay, thereby energizing the clamp relay UCR through the now closed contact WPLR in circuit 360. Energization of the clamp relay is effective to unclamp the billet and to open the normally closed contact UCR in circuit 363 to prevent further movement of the carriage from its position either at the forward or rearward limit.

De-energization of the relay WPLR opens the circuit 332 to the wheel pressure control relay WPCR, de-energizing the latter so that valve 227 returns to its normal position raising the grinding wheel boom to its upper limit clear of the billet. The boom closes limit switch WULS when raised to close the circuit to relay WICR in circuit 362, thereby energizing solenoid 250 of the valve 245, thus reversing cylinder 246 to retract the grinding wheel to its inner limit inwardly of the billet.

Referring to the contacts in circuit 365, after the first side of the billet has been completely ground by the preceding sequence of operations and the wheel has been raised to close contact WULS and the clamp relay is energized to close contact UCR and with contact 2LR closed because of the energization of its relay, the circuit 365 is completed energizing the close coil of latching relay 1CLR in circuit 366 across the normally closed contacts 3CLR, 2CLR and 1CLR. With the energization of the latching relay 1CLR, the billet rotate cycle begins. Energization of relay 1CLR causes the energization of the solenoid 274 of the control valve for the housing lift cylinders to 142 of the turnover mechanism to raise the housing to the FIG. 12 position and thereby lift the unclamped billet from the rest pads of the carriage. When relay 1CLR is closed, the first timer 1TR in circuit 367 is energized through the normally closed contacts 3CLR and 4CLR and the normally open contact 1CLR in said circuit which is now closed. After a first time interval determined by the setting of timer 1TR, its contact 1TR1 in circuit 370 closes energizing the close coil of latching relay 2LR through its normally closed contact. At this point relay 2CLR energizes the solenoid 284 of the cylinder 162 to move the billet inwardly or toward the billet grinder and away from the stops into position to be rotated. This position is shown in FIG. 12.

The second contact of timer 1TR, which is 1TR2 shown in circuit 371, next closes after a slight time delay, and through the normally closed contact 3CLR energizes the close coil of latching relay 3CLR. At this point relay 3CLR energizes the solenoid 294 of the control valve for the rotate cylinder 151 to rotate the jaw and billet 90° to the position shown in FIG. 13. The closing of relay 3CLR and its contacts then energizes the second timer 2TR in circuit 373, and after a brief time delay, contact 2TR1 in circuit 374 closes which energizes the trip coil of relay 1CLR in this circuit. This tripping of the relay 1CLR lowers the housing by de-energizing solenoid 274 and energizing solenoid 281.

Contact 2TR2 of the timer closes next to energize the trip coil of relay 3CLR. The tripping of this relay then de-energizes solenoid 294 and energizes solenoid 291 of the control valve for the rotate cylinder 151 to reverse rotate the jaws 126.

Figure 14:
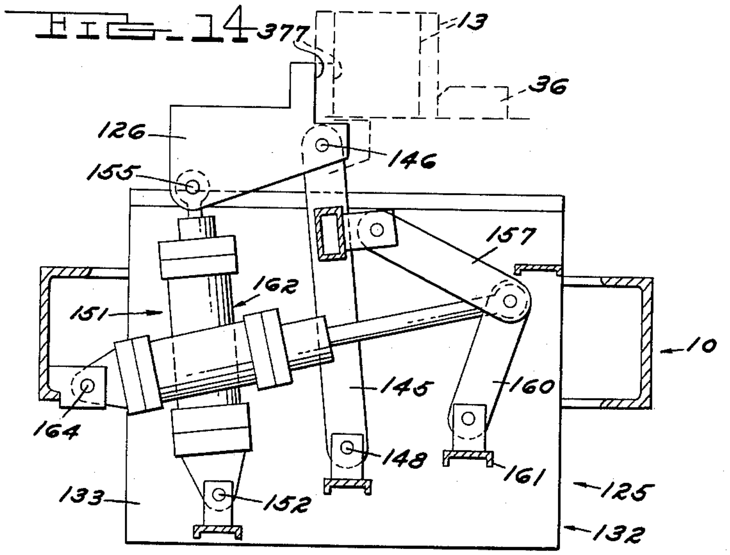
FIGS. 12–14 are like FIG. 11 but show the turnover mechanism in different positions.

Going back somewhat, it is observed that the close coil of relay 4CLR closes only under one specific set of conditions. First of all relay 3CLR must be tripped and its contact 3CLR in circuit 370' closed as shown. Relay 2CLR must be closed and the normally open contact in the circuit to relay 4CLR closed. Then the close coil of relay 4CLR is energized. That is to say, the housing must first raise and move forward with the billet and rotate. Then the housing is lowered and the jaws are reverse rotated. At this point the housing is lowered, forward, and the jaws are reverse rotated, and at this point only relay 4CLR is energized. This results in the energization of timer 3TR in circuit 375 across the contact 4CLR. After a time delay contact 3TR1 of the timer closes, again energizing relay 1CLR. This results in de-energizing solenoid 281 and energizing solenoid 274 to again raise the housing 132. When the housing raises for the second time in this cycle, the jaws are in their normal position of rotation, but inwardly or away from the billet stops 36, as shown in FIG. 14. It will be noted that the jaws have the aligned surfaces 377 at the inner side of the billet in this position. After the next time delay, contact 3TR2 of the timer closes. The closing of this contact energizes the trip coil of relay 2CLR in circuit 379. As a result, the solenoid 283 is de-energized and solenoid 287 is energized to operate cylinder 162 in a manner which moves the jaw outwardly and presses the billet against the back stops 36.

The billet in this position actuates limit switch BPLS which de-energizes relay UCR clamping the billet.

De-energizing relay UCR closes its contact in circuit 382, and through the normally closed contact of 2CLR, relay 4CLR is tripped. This same sequence also trips relay 1CLR which again lowers the housing, completing the rotate cycle. The clamping operation which de-energized relay UCR removes the original signal to rotate by opening the contact UCR in circuit 365.

The trip coil of relay 2LR in circuit 390 was operated when relay 2CLR was energized closing its contact in the circuit. This closed the circuit through line 327 to the wheel-out control relay WOCR, having the effect of energizing solenoid 246 for the valve of the wheel boom cylinder 78 to move the boom out to an initial position in which limit switch WILS is opened to stop the outward movement of the wheel. The wheel cannot be lowered into engagement with the billet until the billet is clamped resulting in the re-energization of relay WPLR in circuit 330. The wheel is then lowered into engagement with the billet as described above in connection with grinding the first billet surface. However during the next cycle, a new face of the billet is presented to the grinding wheel. When the billet is engaged under a predetermined pressure, the circuit to the carriage reversing mechanism is closed and the carriage reciprocates slowly under the grinding wheel. At the end of each stroke of the carriage, the grinding wheel is indexed out a predetermined distance to grind a new portion of the billet surface. Hence the grinding continues without interruption and automatically to grind the four faces of the billet in sequence, rotating the billet to present a new side between each cycle.

A counting arrangement is provided to complete the full cycle after four sides have been ground. During the first rotation in which the billet is rotated for grinding the second side, there is a point where both relays 1CLR and 2CLR are closed simultaneously. When this happens, the close coil of relay 11LR in circuit 400 is energized. The closing of this relay means that we are in the first rotate period and the circuit remains at this point until the rotation has been completed.

When the rotation has been completed, relays 1CLR and 2CLR have both been tripped. Then through the normally closed contacts of relays 1CLR and 2CLR and the previously closed normally open contact of relay 11LR, relay 10CR in circuit 401 is energized. This relay maintains itself through its contact in circuit 402.

This circuit is maintained during the grinding of the second side. When the second side is completed the rotate cycle is again commenced to close relays 1CLR and 2CLR. When this happens we are in the process of rotating from the second to the third side. Since relay 11LR is a latched relay and previously closed, it is now inoperative. However relay 10CR has been previously closed and is now closed. Therefore through the normally open contact of relay 10CR in circuit 403 which is closed, we energize relay 12LR and the circuit remains at this point until completion of the second rotation. After the second rotation, the third side of the billet is in the grinding position, and relays 1CLR and 2 CLR have again been tripped. Again through the two normally closed contacts in series, and this time through contact 12LR in circuit 404, relay 11LR is tripped, indicating that this rotation has been completed.

At the time that relay 12LR in circuit 403 was closed, relay 10CR was de-energized. The circuit now remains at this point until grinding has been completed on the third side, and the third rotation begins. At this point relay contacts 1CLR and 2CLR in circuit 400 again close. Neither relay 11LR nor 10CR can again be re-energized due to the fact that relay 12LR is closed and its contacts prohibit this from happening. However relay 13LR is closed in circuit 408 through the now closed contact 12LR therein. The circuit then remains at this point until completion of the third rotation. On completion of the third rotation when both 1CLR and 2CLR have been tripped and through the contact 13LR in circuit 409, relay 12LR is tripped, thus indicating that we are in position and grinding the fourth side of the billet.

After the fourth side of the billet has been ground and the billet unclamped at either its forward or rearward position with respect to the grinding wheel as described earlier, the circuit 415 to the relay 14LR is closed through contact 13LR in the circuit and through contact UCR in circuit 416, closing the contact 14LR in circuit 418 to the carriage reverse relay CRCR. When the grinding wheel moves up away from the work to close limit switch WULS, the circuit 418 to the carriage reverse relay is closed through the normally closed contact CCLS therein to return the carriage to the loading position whereupon the last-mentioned contact opens. The carriage moves in rapid traverse to the loading position after its trip dog 54 on the lefthand billet clamp engages and operates limit switch SDLS beyond the operative or grinding zone. The limit switch CCLS has another contact in circuit 420 which closes in the loading position of the carriage to energize relays RBCR and 4CR through the circuits 421 and 422. The contact 2LR in circuit 421 is closed when its relay 2LR is energized near the end of the grinding of the fourth side and thereafter the circuit is maintained through the contact of relay 4CR in the circuit. Relay RBCR, upon energization, operates to energize the solenoid 274 of the lift cylinders 142 for the turnover mechanism to raise the jaws 126 upwardly and lift the ground billet from the carriage. The relay 4CR operates more slowly than the relay RBCR and is effective to energize the solenoid 294 of the valve 290 for controlling the jaw rotate cylinder 151. This cylinder rotates to turn the jaws 90° after the billet is raised and ejects the billet over the backside or outerside of the carriage. A timer 4TR in branch circuit 425 has a first contact 4TR1 which opens to de-energize relay RBCR, lowering the carriage. The timer has a second contact 4TR2 which later opens to de-energize relay 4CR and reverse rotate the jaws.

The cycle is now complete and may be reinitiated to load the carriage with a second billet by operating the loader manually as described above whereupon the automatic cycle of operation for grinding the four sides may be initiated by the cycle start button 315.

When the pusher bars move outward to load a new billet on the carriage, the relay 13LR is tripped to wipe out the counter circuit and make it ready for the next cycle. The relay 13LR is tripped when the pusher bars move forward which takes place upon the energization of relay PFCR which has a contact in the circuit 430 to the trip coil of relay 13LR. Relay 14LR is tripped when the carriage returns to loading position to close contact CCLS in circuit 450.

What we claim as our invention is:

1. Mechanism for rotating a work piece positioned on a support comprising a frame structure supported for up and down movement away from and toward an initial lower position, a turn-over member mounted on said frame structure for rotation and for forward and rearward movement relative thereto and having a work piece supporting surface beneath a work piece on said support in said initial lower position of said frame structure, a first power device for raising and lowering said frame structure, a second power device for rotating said member in opposite directions, a third power device for moving said member forwardly and rearwardly relative to said frame structure, means for actuating said first power device to elevate said frame structure to thereby bodily raise said member to lift the work piece from the support and support the same on said supporting surface of said member, means for actuating said third power device in the raised position of said frame structure to move said member forwardly, and means for thereafter actuating said second and first power devices in sequence to rotate said member in one direction and lower said frame structure to thereby rotate and deposit the work piece on the support and return said frame structure to its initial position.

2. The mechanism defined in claim 1 wherein the support has a rear stop adapted to be engaged by the work piece, and means for actuating said third power device in the elevated position of said frame structure for moving said turn-over member rearwardly relative to said frame structure to engage the work piece on the support and move it against the stop.

3. The mechanism defined in claim 1 wherein said member has a second surface at the rear edge of said supporting surface forming a substantial angle therewith to provide a jaw, said second surface being engageable with the rear side of the work piece when the latter is supported on said supporting surface.

4. Mechanism for rotating a work piece positioned on a support comprising a frame structure supported for up and down movement away from and toward an initial lower position, a turn-over member mounted on said frame structure for rotation and for forward and rearward movement relative thereto and having a work piece supporting surface beneath a work piece on said support in said initial lower position of said frame structure, first power device for raising and lowering said frame structure, a second power device for rotating said member in opposite directions, a third power device for moving said member forwardly and rearwardly relative to said frame structure, first control means for actuating said first power device to elevate said frame structure to thereby bodily raise said member to lift the work piece from the support and support the same on said supporting surface of said member, second control means automatically operated in timed relation to the operation of said first control means for actuating said third power device in the raised position of said frame structure to move said member forwardly, third control means automatically operated in timed relation to the operation of said second control means for thereafter actuating said second and first power devices in sequence to rotate said member in one direction and lower said frame structure to thereby rotate and deposit the work piece on the support and return said frame structure to its initial position, and fourth control means automatically operated in timed relation to the operation of said third control means for actuating said second power device to reverse rotate said turnover device.

5. The mechanism defined in claim 4, including fifth control means operative, after said frame structure has been elevated to lift the workpiece from the support and support the same on said supporting surface of said member in the rearward position of the latter, to rotate said member in said one direction and thereby discharge the workpiece at the rear of the support.

6. The mechanism defined in claim 4 wherein the support has a rear stop adapted to be engaged by the work piece, fifth control means automatically operated in timed relation to the operation of said fourth control means for actuating said first power device to again raise said frame structure, and sixth control means automatically operated in timed relation to the operation of said fifth control means for moving said turn-over member rearwardly relative to said frame structure in the raised position thereof to engage the work piece on the support and move it against the stop.

7. The mechanism defined in claim 6 wherein said member has a projecting part providing a second surface at the rear edge of said supporting surface forming a substantial angle therewith to provide a jaw, said second surface being engageable with the rear side of the work piece when the latter is supported on said supporting surface, and said projecting part defining another surface for engagement with the work piece to move it against said stop as aforesaid.

8. Mechanism for rotating a work piece positioned on a support comprising a frame structure supported for up and down movement away from and toward an initial lower position, a turn-over member having a work piece supporting surface, a parallelogram linkage mounting said member on said frame structure for forward and rearward movement with its supporting surface horizontal, said linkage being pivoted to said frame structure and to said turn-over member, said supporting surface being disposed beneath the work piece on the support in the initial lower position of said frame structure and the rearward position of said member relative to said frame structure, one leg of said linkage being extensible and contractable to rotate said member in opposite directions, means for raising said frame structure to lift the work piece from the support and support the same on said supporting surface of said member, means operative in the raised position of said frame structure to swing said linkage forwardly to move said member to its forward position, and means for extending said one leg of said linkage to rotate said member in one direction and means for thereafter lowering said frame structure, whereby the work piece is rotated and deposited on the support and said frame structure is returned to its initial position.

9. The mechanism defined in claim 8, wherein said extensible and contractable leg comprises a piston-cylinder assembly having telescoping piston and cylinder members, one of which is pivoted to said turn-over member and the other of which is pivoted to said frame structure.

10. The mechanism defined in claim 8 wherein the support has a rear stop adapted to be engaged by the work piece, and means operative in the raised position of said frame structure to swing said linkage rearwardly to move said turn-over member to its rearward position to engage the work piece on the support and move it against the stop.

11. Mechanism for rotating a work piece positioned on a support comprising a frame structure supported for up and down movement away from and toward an initial lower position, a turn-over memer having a work piece supporting surface, and parallelogram linkage mounting said member on said frame structure for forward and rearward movement with its supporting surface horizontal, said supporting surface being disposed beneath the work piece on the support in the initial lower position of said frame structure and the rearward position of said member, relative to said frame structure, one leg of said linkage being extensible and contractable to rotate said member in opposite directions, a first power device for raising and lowering said frame structure, a second power device for extending and contracting said one leg of said linkage, a third power device for swinging said linkage forwardly and rearwardly, means for actuating said first power device to elevate said frame structure to thereby bodily raise said member to lift the work piece from the support and support the same on said supporting surface of said member, means for actuating said third power device in the raised position of said frame structure to move said linkage and said member forwardly, and means for thereafter actuating said second and first power devices in sequence to extend said one leg of said linkage rotating said member in one direction and to lower said frame structure to thereby rotate and deposit the work piece on the support and return said frame structure to its initial position.

12. The mechanism defined in claim 11 wherein the support has a rear stop adapted to be engaged by the work piece, and means for actuating said third power device in the elevated position of said frame structure for swinging said linkage rearwardly and correspondingly moving said member to engage the work piece on the support and move it against the stop.

13. The mechanism defined in claim 11 wherein said member has a second surface at the rear edge of said supporting surface forming a substantial angle therewith to provide a jaw, said second surface being engageable with the rear side of the work piece when the latter is supported on said supporting surface.

14. Mechanism for rotating a work piece positioned on a support comprising a frame structure supported for up and down movement away from and toward an initial lower position, a turn-over member having a work piece supporting surface, a parallelogram linkage mounting said member on said frame structure for forward and rearward movement with its supporting surface horizontal, said supporting surface being disposed beneath the work piece on the support in the initial lower position of said frame structure and the rearward position of said member relative to said frame structure, one leg of said linkage being extensible and contractable to rotate said member in opposite directions, a first power device for raising and lowering said frame structure, a second power device for extending and contracting said one leg of said linkage, a third power device for swinging said linkage forwardly and rearwardly, first control means for actuating said first power device to elevate said frame structure to thereby bodily raise said member to lift the work piece from the support and support the same on the supporting surface of said member, second control means automatically operated in timed relation to the operation of said first control means for actuating said third power device in the raised position of said frame structure to swing said linkage forwardly and correspondingly move said member, third control means automatically operated in timed relation to the operation of said second control means for thereafter actuating said second and first power devices in sequence to extend said one leg of said linkage rotating said member in one direction and to lower said frame structure to rotate and deposit the work piece on the support and return said frame structure to its initial position, and fourth control means automatically operated in timed relation to the operation of said third control means for actuating said second power device to contract said one leg of said linkage and reverse rotate said member.

15. The mechanism defined in claim 14 wherein the support has a rear stop adapted to be engaged by the work piece, fifth control means automatically operated in timed relation to the operation of said fourth control means for actuating said first power device to again raise said frame structure, and sixth control means automatically operated in timed relation to the operation of said fifth control means for swinging said linkage rearwardly in the raised position of said frame structure correspondingly moving said member into engagement with the work piece on the support and moving the same against the stop.

16. The mechanism defined in claim 15 wherein said member has a projecting part providing a second surface at the rear edge of said supporting surface forming a substantial angle therewith to provide a jaw, said second surface being engageable with the rear side of the work piece when the latter is supported on said supporting surface, and said projecting part defining another surface for engagement with the work piece to move it against said stop as aforesaid.

17. The mechanism defined in claim 16 having means for rendering inoperative the aforesaid control means, seventh control means for raising said frame structure while said linkage is in a rearward position to thereby bodily raise said member to lift the work piece from the support and support the same on the supporting surface of said member, and eighth control means automatically operated in timed relation to the operation of said seventh control means to extend said one leg of said linkage rotating said member and discharging the work piece over the stop.

18. Mechanism for rotating a work piece positioned on a support comprising a frame structure supported for up and down movement from and toward an initial lower position, a turn-over member mounted on said frame structure and having a work piece supporting surface beneath a work piece on said support in said initial lower position of said frame structure, means mounting said turn-over member on said frame structure comprising a link having a first pivotal connection with said turn-over member and a second pivotal connection with said frame structure at a point spaced from the first pivotal connection, said said first pivotal connection permitting rotation of said turn-over member and said second pivotal connection permitting forward and rearward movement thereof relative to said frame structure, means for elevating said frame structure to bodily raise said member to lift the work piece from the support and support the same on said supporting surface of said member, means for pivoting said link about said second pivotal connection in a forward direction after said frame structure has been raised to move said turn-over member forwardly, and means for rotating said turn-over member about said first pivotal connection and means for thereafter lowering said frame structure, whereby the work piece is rotated and deposited on the support and said frame structure is returned to its initial position.

19. The mechanism defined in claim 18 wherein the support has a rear stop adapted to be engaged by the work piece, and means for moving said turn-over member rearwardly relative to said frame structure in the elevated position thereof to engage the work piece on the support and move it against the stop.

20. Mechanism for rotating a work piece positioned on a support comprising a frame structure supported for up and down movement away from and toward an initial lower position, a turn-over member support means for said turn-over member to which said turn-over member is connected for rotation, said support means mounting said turn-over member on said frame structure for forward and rearward movement relative thereto, said turn-over member having a work supporting surface beneath a work piece on said support in said initial lower position of said frame structure, means for elevating said frame structure to bodily raise said member to lift the work piece from the support and support the same on said supporting surface of said member, means for moving said turn-over member in a forward direction after said frame structure has been raised, and means for rotating said turn-over member and means for thereafter lowering said frame structure, whereby the work piece is rotated and deposited on the support and said frame structure is returned to its initial position.

References Cited in the file of this patent

UNITED STATES PATENTS

| | | |
|---|---|---|
| 678,742 | Kennedy | July 16, 1901 |
| 1,996,465 | Ernst | Apr. 2, 1935 |
| 2,269,697 | Silven | Jan. 13, 1942 |
| 2,296,064 | Silven | Sept. 15, 1942 |
| 2,313,814 | Eisler | Mar. 16, 1943 |
| 2,346,293 | Croy | Apr. 11, 1944 |
| 2,368,259 | Mathys | Jan. 30, 1945 |
| 2,378,066 | De Young | June 12, 1945 |
| 2,436,466 | Wilson | Feb. 24, 1948 |
| 2,489,453 | Fouguet | Nov. 29, 1949 |
| 2,720,963 | Stanley | Oct. 18, 1955 |
| 2,744,639 | Evans | May 8, 1956 |
| 2,819,563 | Lowe | Jan. 14, 1958 |
| 2,860,764 | Barton | Nov. 18, 1958 |
| 2,998,888 | Shimeld | Sept. 5, 1961 |